Patented Sept. 17, 1935

2,014,428

UNITED STATES PATENT OFFICE 2,014,428

AZO DERIVATIVES AND THEIR USE IN DYEING

David Alexander Whyte Fairweather and Robert Fraser Thomson, Grangemouth, Scotland No Drawing. Application June 9, 1932, Serial No. 616,368. In Great Britain June 19, 1931

7 Claims. (Cl. 8—5)

This invention relates to an improved dye and more particularly refers to an azo dye having superior characteristics and methods for its production.

It is an object of this invention to produce an azo derivative which may be applied to the fiber and thereupon rendered insoluble by suitable treatment. A further object is to produce an insoluble azo dye. Additional objects will appear hereinafter.

These objects are accomplished by the present invention wherein a 2-3-hydroxynaphthoic arylide, having substituted thereon a solubilizing group, is coupled with a diazo compound. This compound may be converted to a naphthoquinone by cautious treatment with alkali. The naphthoquinone may then readily be converted to the corresponding azo derivative by treatment with an acid.

The invention may be more fully understood by reference to the following examples:

Example 1

16.8 parts of 5-nitro-ortho-aminoanisole were diazotized in the usual manner and the diazo solution neutralized with sodium acetate. To this solution was added, while stirring a solution of 36.5 parts of sodium-2:3-hydroxynaphthoic-anilide-1-sulfonate. The red precipitate was filtered off and washed with water.

The cake was suspended in water, containing 10 parts of sodium carbonate, at ordinary temperature, for a few minutes, and the dyestuff was filtered off and washed with brine.

Example 2

A dye bath was made up by adding to 4000 parts of water, 6 parts of a 10% paste of the dyestuff obtained by the method of Example 1.

At 40-50° 100 parts of wool were entered and the temperature was gradually raised to 90° while working the material. Exhaustion was effected by the addition of small quantities of acetic acid. When exhaustion was complete, 10–20 parts of sulfuric acid were added to the bath. After a few minutes the formation of the insoluble azo dyestuff was complete and the wool was lifted, washed and finished.

It is to be understood that numerous 2-3-hydroxy-naphthoic arylides may be used as starting materials in carrying out the process of the present invention. These compounds should contain a solubilizing group which renders them readily soluble in water. The sulfonic acid group has been found to give very satisfactory results, although other solubilizing groups might also be used with excellent results. Upon the addition of a diazo solution to a neutral or acidic solution of the 2-3-hydroxy-naphthoic arylide described above, coupling takes place. Where the starting material is 1-sulfo-2-3-hydroxynaphthoic arylide, coupling will occur in the one position.

If the diazo solution is then cautiously treated with an alkali, preferably sodium carbonate, it is converted to a naphthoquinone. The naphthoquinone is readily changed to the corresponding azo compound by treatment with an acid; sulfuric acid having been found to give excellent results. This acid treatment splits off the solubilizing group and renders the compound insoluble. By treating the material to be dyed with the compound before splitting off the solubilizing group a dye is obtained which is exceptionally fast to washing.

The process of the present invention is not confined to the case where the material to be dyed is treated solely with the products mentioned herein, since it is also intended to cover treatment of the material with other products, such as enolic sulfuric ester salts of vat dyestuffs or other quinones, including such enolic sulfuric ester salts as are converted to dyestuffs by the action of acid alone or where they are treated with dyes corresponding to British specification No. 333,506, in conjunction with the compounds of the present invention. Excellent results may be obtained by using the compounds of the present invention in conjunction with other dyes and this combined use is intended to be covered by the present invention.

As many apparently widely different embodiments of this invention may be made without departing from the spirit and scope thereof, it is to be understood that we do not limit ourselves to the specific embodiments thereof except as defined in the appended claims.

We claim:

1. A process which comprises reacting a 2-3 hydroxy-naphthoic arylamide, having substituted thereon in the one-position a solubilizing group, with a diazo compound, treating the resulting compound with an alkali, impregnating the fibers to be dyed with the product thereof, and fixing the dye thereon by treatment with an acid.

2. A process which comprises reacting a 1-sulfo-2-3-hydroxy-naphthoic arylamide with a diazo compound, treating the resulting compound with an alkali, impregnating the fibers to be dyed with the product thereof, and fixing the dye thereon by treatment with an acid.

3. A process which comprises reacting a 1-sulfo-2-3-hydroxy-naphthoic arylamide with a diazo compound, treating the resulting compound with sodium carbonate, impregnating the fibers to be dyed with the product thereof, and fixing the dye thereon by treatment with an acid.

4. The process of claim 3 wherein the dye is fixed on the fiber by treatment with sulfuric acid.

5. A process which comprises reacting diazotized 5-nitro-o-aminoanisole with 1-sulfo-2-3-hydroxy-naphthoic-anilide, treating the resulting compound with sodium carbonate, impregnating the fibers to be dyed with the product thereof, and fixing the dye thereon by treatment with sulfuric acid.

6. A process for producing insoluble azo dyes which comprises treating a compound having the following general formula:

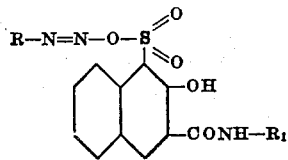

wherein R and $R_1$ represent the residues of aromatic amines free from water-solubilizing groups, with an alkali, impregnating the fibers to be dyed with the product thereof, and fixing the dye thereon by treatment with an acid.

7. A process for producing insoluble azo dyes which comprises treating a compound having the following general formula:

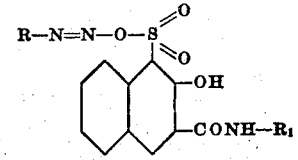

wherein R and $R_1$ represent the residues of aromatic amines of the benzene series, free from water-solubilizing groups, with sodium carbonate, impregnating the fibers to be dyed with the product thereof, and fixing the dye thereon by treatment with sulfuric acid.

DAVID A. W. FAIRWEATHER.
ROBERT FRASER THOMSON.